US011698763B2

United States Patent
Mariyama

(10) Patent No.: US 11,698,763 B2
(45) Date of Patent: Jul. 11, 2023

(54) INFORMATION PROCESSING APPARATUS FOR REGISTERED FILES AND ISSUING IDENTIFICATION INFORMATION FOR TRACKING AN EVALUATION OF A USER USING THE FILES

(71) Applicant: FUJIFILM Business Innovation Corp., Tokyo (JP)

(72) Inventor: Daiki Mariyama, Kanagawa (JP)

(73) Assignee: FUJIFILM Business innovation Corp., Tokyo (JP)

( * ) Notice: Subject to any disclaimer, the term of this patent is extended or adjusted under 35 U.S.C. 154(b) by 0 days.

(21) Appl. No.: 17/386,166

(22) Filed: Jul. 27, 2021

(65) Prior Publication Data
US 2022/0300220 A1    Sep. 22, 2022

(30) Foreign Application Priority Data
Mar. 18, 2021    (JP) .................................. 2021-044949

(51) Int. Cl.
*G06F 3/12*    (2006.01)
*G06F 16/11*    (2019.01)

(52) U.S. Cl.
CPC ............ *G06F 3/1222* (2013.01); *G06F 3/126* (2013.01); *G06F 3/128* (2013.01); *G06F 3/1238* (2013.01); *G06F 3/1275* (2013.01); *G06F 16/122* (2019.01)

(58) Field of Classification Search
CPC ..... G06F 3/1222; G06F 3/1238; G06F 3/1275
See application file for complete search history.

(56) References Cited

U.S. PATENT DOCUMENTS

| | | | |
|---|---|---|---|
| 2017/0041296 A1* | 2/2017 | Ford | G06F 21/64 |
| 2020/0278820 A1* | 9/2020 | Awatsu | G06F 3/1204 |
| 2020/0311027 A1* | 10/2020 | Mariyama | G06F 16/162 |
| 2020/0344364 A1* | 10/2020 | Sera | H04N 1/00145 |

FOREIGN PATENT DOCUMENTS

JP    2013-012052 A    1/2013

* cited by examiner

*Primary Examiner* — Benjamin O Dulaney
(74) *Attorney, Agent, or Firm* — Oliff PLC

(57) ABSTRACT

An information processing apparatus includes: a processor configured to: when performing control of outputting a file from a storage unit in accordance with a request from a using user, issue second identification information to the using user, the file having been stored by a registering user in the storage unit, the file being associated with first identification information for identifying the file, the second identification information to be used for recording information related to use of the file; and upon receipt of the second identification information from the using user, perform control of recording the information related to the use of the file.

11 Claims, 8 Drawing Sheets

| KEY | FILE STORAGE LOCATION | SHARE FLAG |
|---|---|---|
| 12345678 | FILE SERVER / file / 12345678 | YES |

| FEEDBACK ID | KEY | VALID FLAG |
|---|---|---|
| 1i94maua2emfdsih | 12345678 | YES |
| 9mfd48onow4a8w | 12345678 | NO |
| 845qmmaklfsfnd | ABCDEFGH | YES |

INFORMATION PROCESSING APPARATUS FOR REGISTERED FILES AND ISSUING IDENTIFICATION INFORMATION FOR TRACKING AN EVALUATION OF A USER USING THE FILES

CROSS-REFERENCE TO RELATED APPLICATIONS

This application is based on and claims priority under 35 USC 119 from Japanese Patent Application No. 2021-044949 filed Mar. 18, 2021.

BACKGROUND

(i) Technical Field

The present disclosure relates to an information processing apparatus and a non-transitory computer readable medium.

(ii) Related Art

In the related art, various information such as files have been exchanged using a social network service (SNS). An information processing apparatus such as a commercial transaction support apparatus is known which uses the SNS to cause a seller to promote an item and to provide an item or a service to a purchaser. For example, JP-A-2013-012052 discloses a commercial transaction support apparatus including a posting page generator, a posting unit, and an SNS page generator. The posting page generator generates a posting page for posting to an in-site SNS and an off-site SNS on a terminal device (purchaser terminal) operated by a person who wants to purchase and transmits the posting page to an access source. The posting unit stores estimate request information on an item that the person wants to purchase and/or a service that the person wants to purchase which are input through the posting page displayed on the purchaser terminal, in a storage unit as post information for the in-site SNS. The posting unit posts the estimate request information to the off-site SNS. The posting unit stores estimate information indicating an estimate that is made based on the estimate request information displayed on a terminal device operated by a seller who provides the item that the person wants to purchase and/or the service that the person wants to purchase in the storage unit as the post information for the in-site SNS. The SNS page generator generates a page on which the posted information stored in the storage unit is published as published information of the in-site SNS and transmits the page to the access source.

SUMMARY

When a file is registered so as to be available to plural users, information such as posts by other users with respect to the registered file are valid. However, the information such as the posts by the other users may lack accuracy. A user who has registered the file may not be able to obtain appropriate information on the registered file.

Aspects of non-limiting embodiments of the present disclosure relate to an information processing apparatus and a non-transitory computer readable medium that can, when a file that has been registered so as to be available to plural users is used by another user different from a user who has registered the file, present information about the use of the file to the registering user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: when performing control of outputting a file from a storage unit in accordance with a request from a using user, issue second identification information to the using user, the file having been stored by a registering user in the storage unit, the file being associated with first identification information for identifying the file, the second identification information to be used for recording information related to use of the file; and upon receipt of the second identification information from the using user, perform control of recording the information related to the use of the file.

BRIEF DESCRIPTION OF THE DRAWINGS

Exemplary embodiment(s) of the present disclosure will be described in detail based on the following figures, wherein.

DETAILED DESCRIPTION

Figure 1:
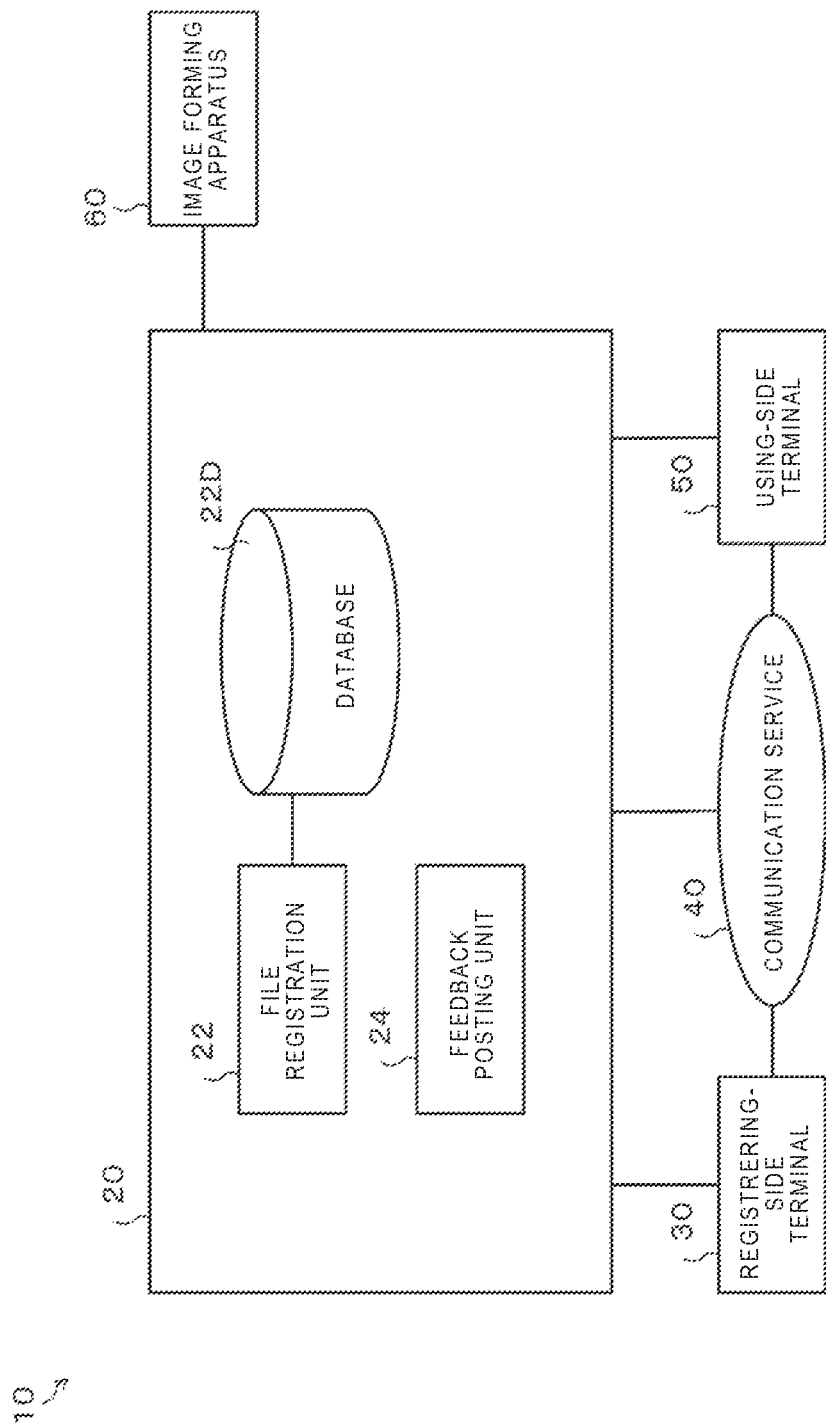
FIG. 1 is a diagram illustrating a schematic configuration of an information processing system according to an exemplary embodiment.

Hereinafter, an example of an exemplary embodiment for carrying out a technique of the present disclosure will be described in detail with reference to the drawings. The same reference numerals are given to elements and processes that have the same operation, advantage, and function throughout all the drawings. Redundant description may be omitted as appropriate. Each drawing merely schematically illustrates the example of the exemplary embodiment to an extent that the technique of the present disclosure can be sufficiently understood. Therefore, the technique of the present disclosure is not limited only to the illustrated example. In the exemplary embodiment, the description may be omitted for a configuration that is not directly related to the present disclosure or a well-known configuration.

FIG. 1 is a diagram illustrating a schematic configuration of an information processing system 10 according to the present exemplary embodiment. The information processing system 10 is a system that enables registration and posting with respect to a file for printing (hereinafter, referred to as a "print file"), and will be described as an example of a system to which the technique of the present disclosure can be applied. Specifically, a system that, when the print file is registered so as to be available to plural users, enables posting feedback information (for example, allows another user to make a post) to the registered file will be described.

Figure 2:
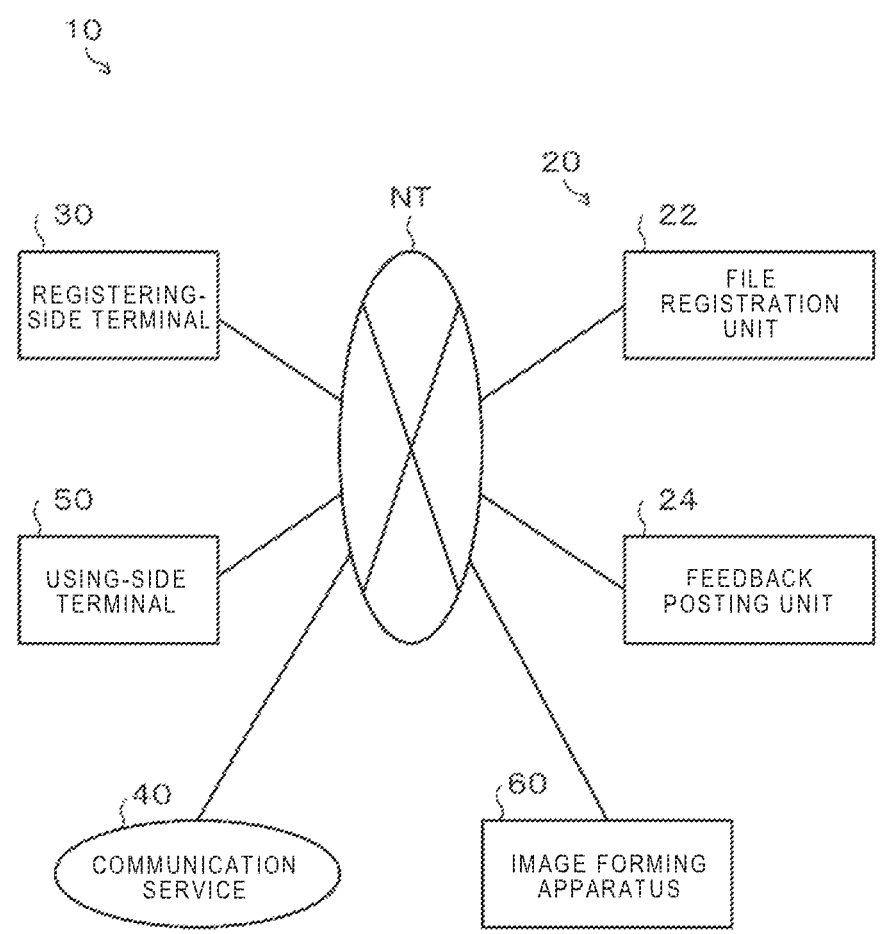
FIG. 2 is a diagram illustrating an example of a specific configuration to which the information processing system according to the exemplary embodiment is applied.

As illustrated in FIG. 1, the information processing system 10 includes an information processing apparatus 20, a registering-side terminal 30, a using-side terminal 50, and an image forming apparatus 60. These apparatuses are connected to a network NT (FIG. 2) and can communicate with each other via the network NT (FIG. 2). Examples of the network NT include the Internet, a local area network (LAN), and a wide area network (WAN).

In the present exemplary embodiment, a case will be described in which the information processing system 10 is capable of using a communication service 40. The communication service 40 is an example of a system that provides a site capable of supporting construction of communication between users by sharing information such as sharing files using the network. The communication service 40 is applicable to a communication service that enables the users to communicate with each other, such as an SNS, an Internet forum, a news site, and a blog. In the present exemplary embodiment, the SNS is employed as an example of the communication service 40. The communication service 40 is hereinafter referred to as an "SNS 40". Since the communication service such as the SNS is a known technique, detailed description of a configuration and an operation thereof will be omitted.

The information processing apparatus 20 is an apparatus that allows a using user to use a print file of a registering user and executes a process of supporting posting of feedback information of the using user who has used the print file. Specifically, the information processing apparatus 20 executes a series of processes that allow the user who has registered the print file (hereinafter referred to as the "registering user") to refer to posts such as feedback from the user who has used the print file (hereinafter referred to as the "using user").

The information processing apparatus 20 includes a file registration unit 22 that executes a process of registering the print file, and a feedback posting unit 24 that executes a feedback process on the print file. The information processing apparatus 20 includes a database 22D for registering the print file.

FIG. 2 is a diagram illustrating an example of a configuration in a case where the information processing system 10 according to the present exemplary embodiment is applied to a specific apparatus.

As illustrated in FIG. 2, the information processing apparatus 20 includes the file registration unit 22 and the feedback posting unit 24. The file registration unit 22 and the feedback posting unit 24 are connected to the network NT and can communicate with each other via the network NT. In the present exemplary embodiment, the file registration unit 22 and the feedback posting unit 24 operate in cooperation with each other to function as the information processing apparatus 20. Therefore, the information processing system 10 includes the information processing apparatus 20 including the file registration unit 22 and the feedback posting unit 24, the registering-side terminal 30, the SNS 40, the using-side terminal 50, and the image forming apparatus 60.

Registering-Side Terminal

The registering-side terminal 30 is a terminal device that is operated by the registering user. The registering-side terminal 30 transmits various instructions related to a process (such as registering of the print file and browsing of the feedback information with respect to the registered print file) to the information processing apparatus 20. For example, a general-purpose computer such as a server computer or a personal computer (PC) is applied to the registering-side terminal 30.

Figure 3:
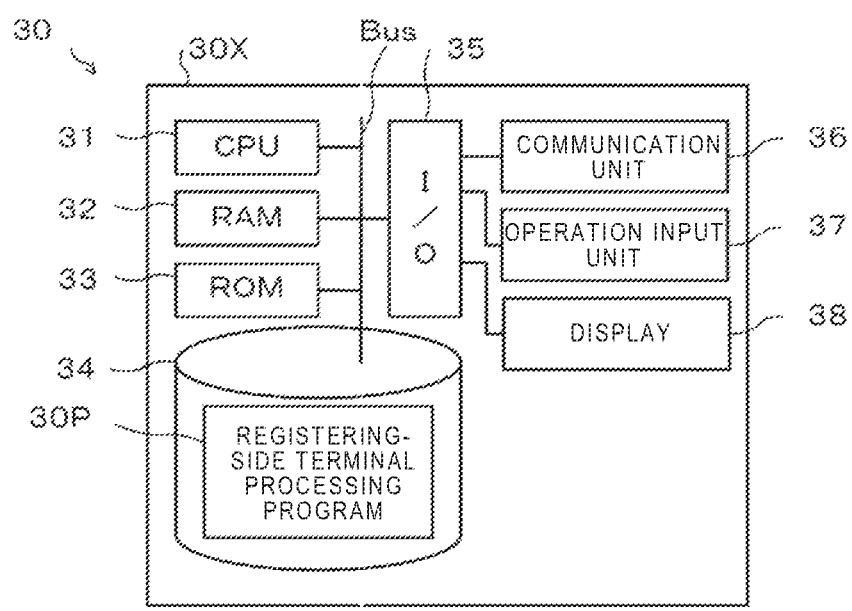
FIG. 3 is a diagram illustrating an example of a schematic configuration of a registering-side terminal according to the exemplary embodiment.

As illustrated in FIG. 3, the registering-side terminal 30 includes a computer body 30X. The computer body 30X includes a CPU 31, a RAM 32, a ROM 33, and an I/O 35, which are connected to each other via a bus Bus. A storage unit 34 that may be implemented by an HDD, a non-volatile flash memory, or the like is connected to the bus Bus. A communication unit 36, an operation input unit 37, and a display 38 are connected to the I/O 35. The communication unit 36 communicates with an external apparatus. The registering user checks information displayed on the input operation unit 37 and operates the operation input unit 37 to make an input. The display 38 displays information. The storage unit 34 stores a registering-side terminal processing program 30P.

Using-Side Terminal

The using-side terminal 50 is a terminal device that is operated by the using user. The using-side terminal 50 transmits various instructions related to a process such as using of the registered file and posting of the feedback information with respect to the used registered file. The using-side terminal 50 has the same configuration as that of the registering-side terminal 30.

Figure 4:
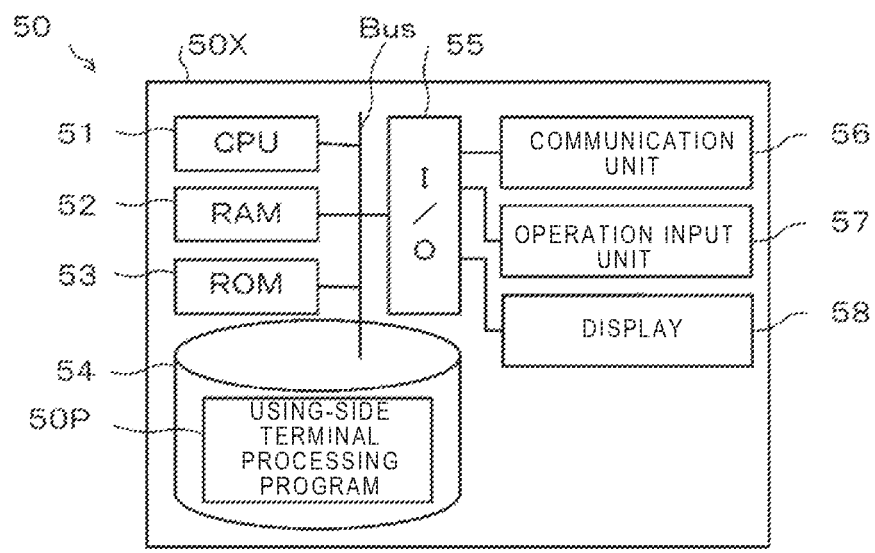
FIG. 4 is a diagram illustrating an example of a schematic configuration of a using-side terminal according to the exemplary embodiment.

As illustrated in FIG. 4, the using-side terminal 50 includes a computer body 50X. The computer body 50X includes a CPU 51, a RAM 52, a ROM 53, and an input and output port (I/O) 55, which are connected to each other via a bus Bus. A storage unit 54 is connected to the bus Bus. A communication unit 56, an operation input unit 57, and a display 58 are connected to the I/O 55. The storage unit 54 stores a using-side terminal processing program 50P.

Image Forming Apparatus

The image forming apparatus 60 is an apparatus that executes a process of printing the registered file in response to a request from the using user. The image forming apparatus 60 includes a general-purpose computer.

Figure 5:
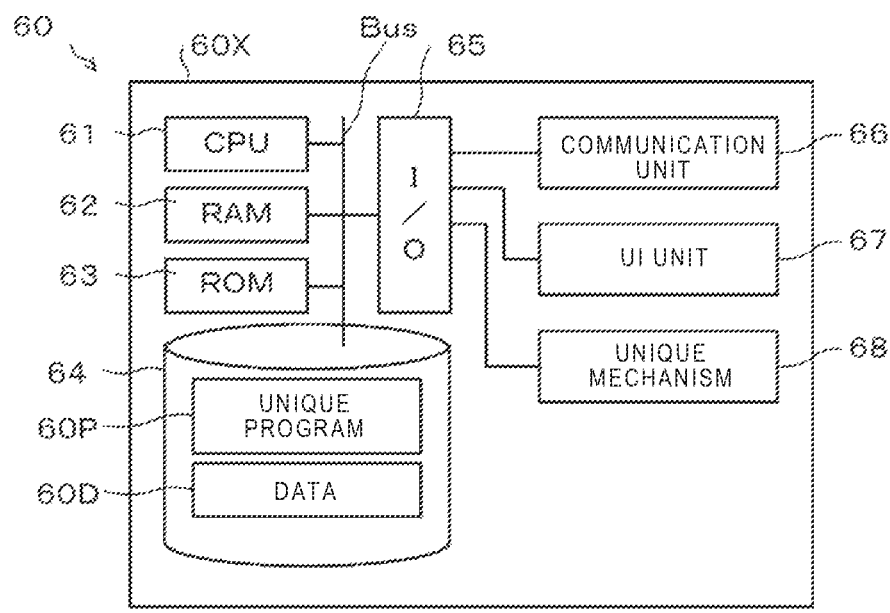
FIG. 5 is a diagram illustrating an example of a schematic configuration of an image forming apparatus according to the exemplary embodiment.

As illustrated in FIG. 5, the image forming apparatus 60 includes a computer body 60X. The computer body 60X includes a CPU 61, a RAM 62, a ROM 63, and an input and output port (I/O) 65, which are connected to each other via a bus Bus. A storage unit 64 is connected to the bus Bus. A communication unit 66, a UI unit 67 such as a touch panel capable of displaying an image, and a unique mechanism 68 are connected to the I/O 65.

The unique mechanism 68 includes a mechanism unique to a device for implementing an image processing function. Examples of the image processing function include an image forming function including an image copying function of copying an original document and an image printing function of printing data of an input original document, and an image reading function of reading (scanning) the original document as an image to convert the original document into data. Examples of the unique mechanism 68 include a scanner that scans the original document and a printer that prints various data. The storage unit 64 stores a unique program 60P that causes the image forming apparatus 60 to function as an implementation apparatus that implements the image processing function. The storage unit 64 also stores various data 60D to be used in the image forming apparatus 60. With such a configuration, the image forming apparatus 60 that has executed the unique program 60P operates so as to be able to execute the image processing function including the image forming function and the image reading function.

File Registration Unit

The file registration unit 22 is an execution device that executes a process related to the registering of the print file, and is also a functional unit that implements a part of the functions of the information processing apparatus 20. Specifically, the file registration unit 22 is a device that executes a process of registering the print file in the database 22D according to an instruction from the registering user. That is, when the print file is transmitted from the registering-side terminal 30, the file registration unit 22 stores the transmitted print file in the database 22D. The file registration unit 22 issues a key (specifically, a file specifying key) as first identification information for uniquely identifying the print file, and registers the file specifying key in the database 22D. The file registration unit 22 also has a function of (i) issuing a key (specifically, a feedback ID) as second identification information indicating that it is possible to make feedback on the print file, when printing of the print file has been requested and the printing of the print file is completed, and (ii) registering the feedback ID in the database 22D.

Figure 6:
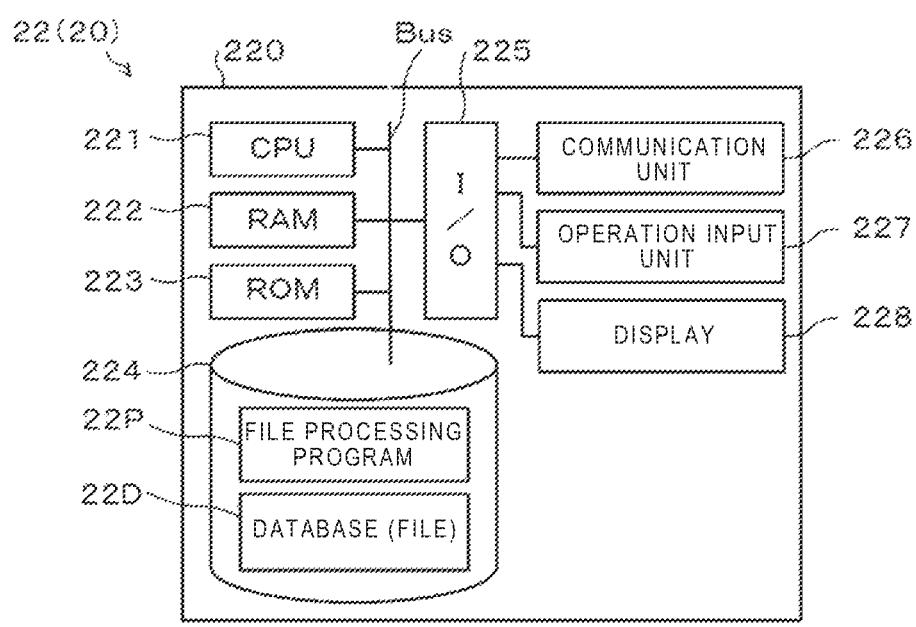
FIG. 6 is a diagram illustrating an example of a schematic configuration of a file registration unit in an information processing apparatus according to the exemplary embodiment.

As illustrated in FIG. 6, the file registration unit 22 includes a computer body 220. The computer body 220 includes a CPU 221, a RAM 222, a ROM 223, a storage unit 224, and an I/O 225. The CPU 221, the RAM 222, the ROM 223, the storage unit 224, and the I/O 225 are connected to each other via a bus Bus.

Functional units including a communication unit 226 that can communicate with an external apparatus, an operation input unit 227, and a display 228 are connected to the I/O 225. These functional units can communicate with the CPU 221 via the I/O 225.

The computer body 220 may be configured as a sub-controller that controls a part of operation of the information processing apparatus 20, or may be configured as a part of a main-controller that controls an overall operation of the information processing apparatus 20. For example, an integrated circuit such as a large scale integration (LSI) or an integrated circuit (IC) chip set is used for a part or all of blocks of the computer body 220. Individual circuits may be used for the respective blocks. Alternatively, a circuit in which a part or all of the individual circuits are integrated may be used for each block. The blocks may be integrally provided, or a part of the blocks may be provided separately. A part of each of the blocks may be provided separately. Integration of the computer body 220 is not limited to the LSI. A dedicated circuit or a general-purpose processor may be used.

The storage unit 224 stores a file processing program 22P that causes the file registration unit 22 to function as a device in the information processing apparatus 20 that executes a file registration process. The CPU 221 reads the file processing program 22P from the storage unit 224, loads the file processing program 22P into a RAM 222, and executes the process. Accordingly, the file registration unit 22 that has executed the file processing program 22P operates as the information processing apparatus of the present disclosure. The file processing program 22P may be provided in a form of a recording medium such as a CD-ROM. The CPU 221 reads the file processing program 22P from the recording medium, loads the file processing program 22P into the RAM 222, and executes the process. Accordingly, the file registration unit 22 that has executed the file processing program 22P operates as the information processing apparatus of the present disclosure.

The database (DB) 22D is stored in the storage unit 224. Data that are available on the information processing apparatus 20 are accumulated in the DB 22D. The database 22D is not limited to one stored in the storage unit 224. For example, the database 22D may be stored in an external apparatus (not illustrated) that is used in a file server or the like, and may perform inquiry or writing to the external device (not illustrated) via a communication line.

Feedback Posting Unit

The feedback posting unit 24 is an execution device that executes a process related to the feedback process on the print file, and is also a functional unit that implements a part of the functions of the information processing apparatus 20. Specifically, the feedback posting unit 24 is a device that executes a process of registering the feedback information including feedback on the print file based on the key (that is, the feedback ID), which is the second identification information issued in printing the print file. For example, the feedback posting unit 24 is a device capable of carrying out feedback to the SNS 40.

Figure 7:
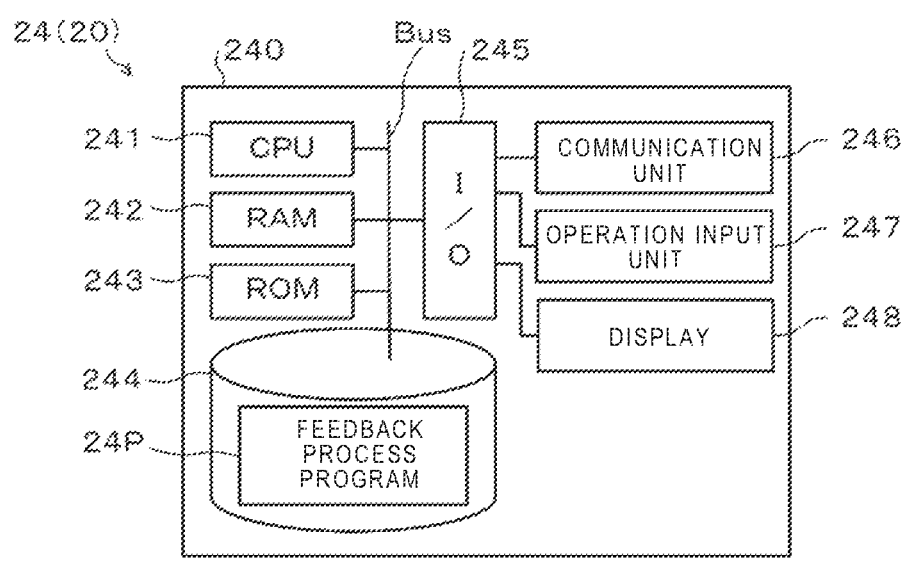
FIG. 7 is a diagram illustrating an example of a schematic configuration of a feedback posting unit in the information processing apparatus according to the exemplary embodiment.

As illustrated in FIG. 7, similarly to the file registration unit 22, the feedback posting unit 24 includes a computer body 240. The computer body 240 includes a CPU 241, a RAM 242, a ROM 243, a storage unit 244, and an I/O 245. The CPU 241, the RAM 242, the ROM 243, the storage unit 244, and the I/O 245 are connected to each other via a bus Bus. Functional units including a communication unit 246, an operation input unit 247, and a display 248 are connected to the I/O 245.

The storage unit 244 stores a feedback process program 24P that causes the feedback posting unit 24 to function as an execution device in the information processing apparatus 20 that executes a feedback posting process. The CPU 241 reads the feedback process program 24P from the storage unit 224, loads the feedback process program 24P into the RAM 243, and executes the process. Accordingly, the feedback posting unit 24 that has executed the feedback process program 21P operates as the information processing apparatus of the present disclosure.

Operation of Information Processing System

Next, an operation of the information processing system 10 will be described focusing on an operation of the information processing apparatus 20 according to the present exemplary embodiment. In the present exemplary embodiment, a description will be given of a case in which a print file is registered by a registering user so as to be available to a using user, the using user prints the registered print file with the image forming apparatus 60, and then feedback information related to the print file printed by the using user is posted.

Figure 8:
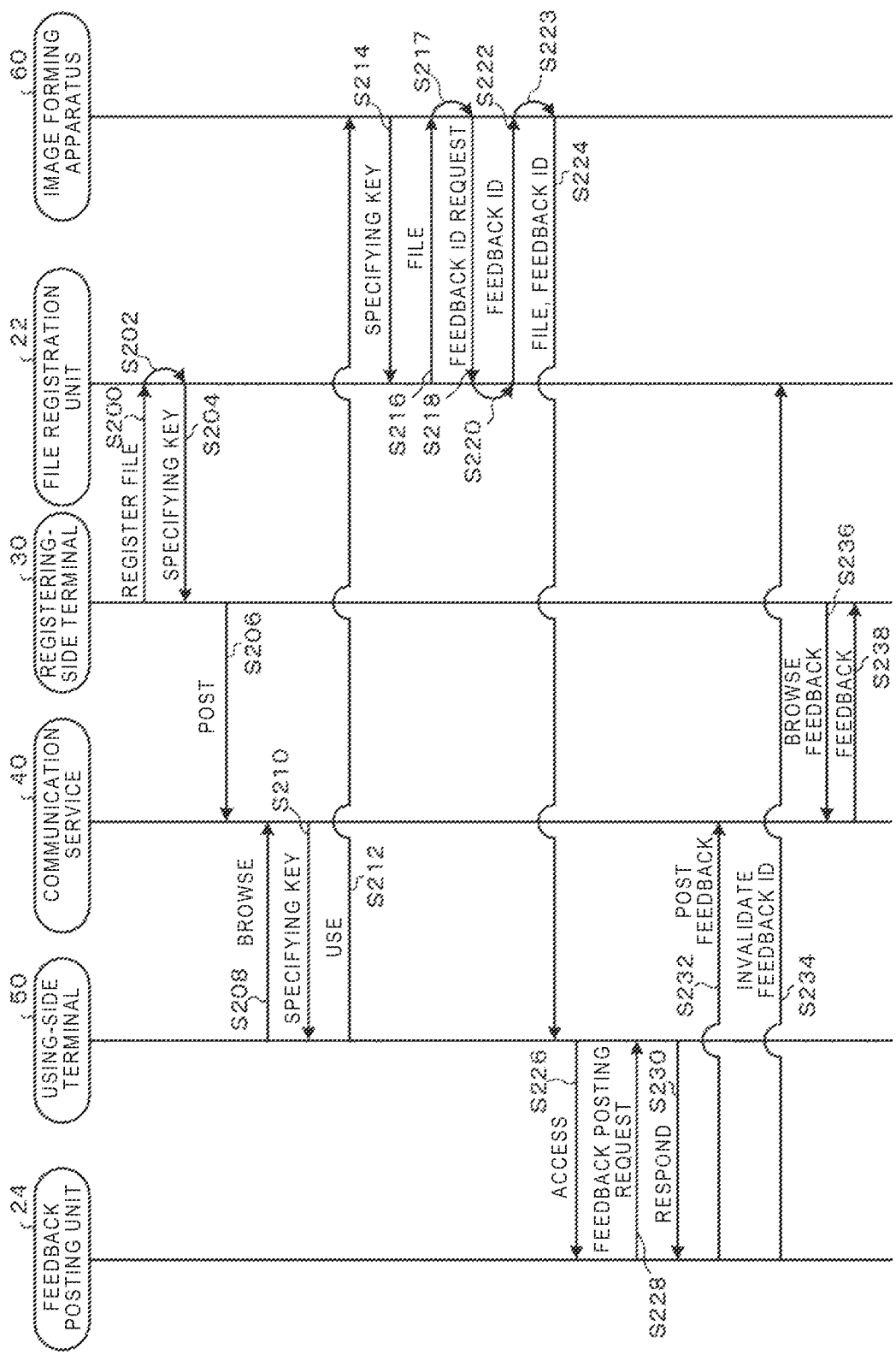
FIG. 8 is a diagram illustrating an example of a flow of information processing in the information processing system according to the exemplary embodiment.

FIG. 8 is a diagram illustrating an example of a flow of information processing in and between the devices of the information processing system 10.

As illustrated in FIG. 8, the registering user uploads the print file that he/she wants to register to the file registration unit 22 of the information processing apparatus 20 (step S200). Specifically, the CPU 31 of the registering-side terminal 30 transmits the print file specified by the registering user as a file to be registered in the file registration unit 22. The print file that the registering user wants to register may be specified by, for example, a file name of the print file.

The file registration unit 22 receives the print file (for example, the print file specified by the name) from the registering-side terminal 30, and executes a registration process of the print file (step S202). The registration process of the print file includes (i) registering the received print file in the database 22D and (ii) generating a file specifying key for identifying the registered print file. In the registration process of the print file, the print file (for example, the file name) and the file specifying key are registered in association with each other. Specifically, the CPU 221 of the file registration unit 22 receives the print file from the registering-side terminal 30 and registers the print file in the database 22D. The CPU 221 of the file registration unit 22 generates the file specifying key. That is, upon registering the print file in the database 22D, the CPU 221 of the file registration unit 22 generates and register the file specifying key for associating the print file with the registered print file. The CPU 221 of the file registration unit 22 may register information including, for example, a registration date and time of the print file and/or a size of the print file in the database 22D as information related to the print file, in association with the file name of the print file or the file specifying key. The information related to the print file may include information indicating a location of the registered print file on the database 22D, for example, a location where the print file registered can be specified via the network NT. Then, the file registration unit 22 executes a process of issuing, that is, transmitting at least the generated file specifying key as a response to the registering-side terminal 30 from which the registration request has been received (step S204). In step S204, the file registration unit 22 may generate a reduced image (for example, a thumbnail image) of the registered print file, and transmit information including the generated reduced image or the information related to the print file.

The file specifying key also serves as information indicating that, after the registration, the registered print file will be specified with the file specifying for print, that is, serves as reservation information indicating that printing has been reserved. In this aspect, reservation information for reserving printing may be registered. Character string information indicating an alphanumeric character string having a predetermined number of digits (for example, 8 digits or 12 digits a character string including symbols may be applied to the file specifying key. In the generation of the file specifying key, character string information indicating a character string including, for example, a combination of random characters may be generated so as to be unique information to each print file. The file specifying key is not limited to the character string information, but may be code information (for example, one-dimensional or two-dimensional barcode) corresponding to the character string information.

Accordingly, the information processing apparatus 20 registers the print file in the database 22D in response to the request for registration of the print file from the registering-side terminal 30, generates at least the file specifying key for specifying the print file, and transmits the generated file specifying key as the response to the registering-side terminal 30.

Figures 9, 10, 11:
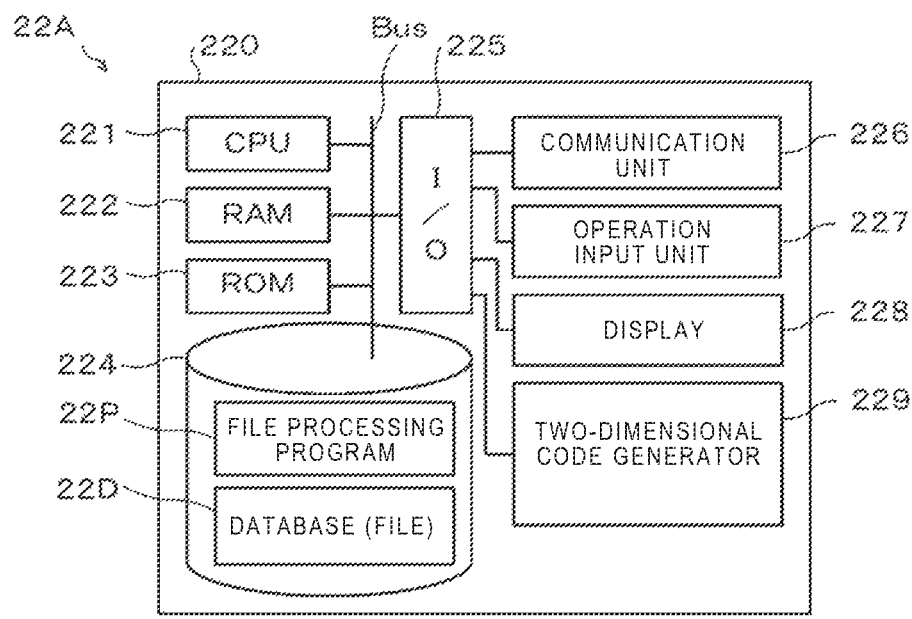
FIG. 9 is a diagram illustrating an example of information related to a print file registered in a database in the information processing apparatus according to the exemplary embodiment.
FIG. 10 is a diagram illustrating an example of information related to a feedback ID for the print file registered in the database in the information processing apparatus according to the exemplary embodiment.
FIG. 11 is a diagram illustrating a configuration example of a file registration unit according to a first modification.

FIG. 9 is a diagram illustrating an example of the information related to the print file registered in the database 22D. As illustrated in FIG. 9, in the information related to the print file, respective information, that is, the file specifying key, the location of the registered print file (that is, a file storage location) on the database 22D, and a share flag are registered in association with each other. The share flag is information indicating whether the print file is available to the using user. "YES" is stored in the share flag when the print file is set to be available to the using user; otherwise, "NO" is stored.

As illustrated in FIG. 8, by the information processing described above, the registering user can acquire the file specifying key, that is, information for specifying the print file that he/she wanted to register, on the network NT. Upon acquiring the file specifying key, the registering user posts the information including the file specifying key to the SNS 40 in order to allow the registered print file to be available to the using user (step S206). Specifically, the CPU 31 of the registering-side terminal 30 transmits, to the SNS 40, the print file (for example, the thumbnail image) and the information related to the print file including the file specifying key associated with the print file, so as to post the print file and the information related to the print file.

When the share flag has been set to "NO" by the registering user, the CPU 31 of the registering-side terminal 30 does not post the registered print file to the SNS 40, or posts the registered print file to the SNS 40 in a manner that is unavailable to the using user and posts the registered print file. On the other hand, when the share flag has been set to "YES", the CPU 31 of the registering-side terminal 30 posts the registered print file to the SNS 40 so as to be available to the using user. Specifically, in this posting, the CPU 31 of the registering-side terminal 30 posts the information including the file specifying key of the print file, and this posting allows the using user to browse the print file (for example, the thumbnail image).

The SNS 40 receives the post from the registering-side terminal 30 and performs control of allowing the user to browse the post.

Meanwhile, by browsing the post in the SNS 40, the using user browses the print file (for example, the thumbnail image) of the registering user (step S208), specifies the print file to be used, and acquires the file specifying key of the print file (step S210). Specifically, in order for the using user to browse the post on the SNS 40, the CPU 51 of the using-side terminal 50 accesses the SNS 40, transmits a signal indicating a request for browsing the post, and receives the file specifying key for specifying the print file posted by the registering user from the SNS 40.

Then, in order to use (print) the specified print file, the using user inputs the file specifying key of the print file to the image forming apparatus 60 (step S212). The image forming apparatus 60 receives an instruction to print the print file by the using user. Specifically, the CPU 61 of the image forming apparatus 60 acquires the file specifying key indicating the print file by reading information input to the unit 67.

The image forming apparatus 60 requests the file registration unit 22 for the print file corresponding to the file specifying key input by the using user (step S214). Specifically, the CPU 61 of the image forming apparatus 60 requests an output of the print file by transmitting the file specifying key input to the file registration unit 22.

The file registration unit 22 transmits the print file corresponding to the received file specifying key as a response to the image forming apparatus 60 (step S216). Specifically, the CPU 221 of the file registration unit 22 extracts, from the database 22D, the print file (FIG. 9) that has been registered in association with the received file specifying key, and returns the extracted print file to the image forming apparatus 60.

The image forming apparatus 60 receives the print file transmitted from the file registration unit 22 and executes a print process (step S217).

Accordingly, according to the request for the output of the print file that the image forming apparatus 60 has made using the file specifying key, the information processing apparatus 20 specifies the corresponding print file with the database 22D. Then, the information processing apparatus 20 transmits the specified print file to the image forming apparatus 60 as the response.

Next, when the printing of the print file is completed, the image forming apparatus 60 requests the file registration unit 22 for a feedback ID (step S218). Specifically, the CPU 61 of the image forming apparatus 60 requests the feedback ID by transmitting, to the file registration unit 22, information indicating a request for the feedback ID associated with the printed print file.

When receiving the information indicating the request for the feedback ID, the file registration unit 22 executes a process of generating the feedback ID and registers the feedback ID in the database 22D (step S220). The file registration unit 22 transmits the generated feedback ID to the image forming apparatus 60 as the response (step S222). Specifically, upon receipt of the request for the feedback ID, the CPU 221 of the file registration unit 22 generates the feedback ID (FIG. 10), and returns the feedback ID to the image forming apparatus 60.

Character string information indicating an alphanumeric character string having a predetermined number of digits (for example, 14 digits or 16 digits) or a character string including symbols may be applied to the feedback ID. In the generation of the feedback ID, character string information indicating a character string including, for example, a combination of random characters may be generated so as to be a unique feedback to each printed print file. The feedback ID is not limited to the character string information, but may be code information (for example, one-dimensional or two-dimensional barcode) corresponding to the character string information.

FIG. 10 is a diagram illustrating an example of information related to the feedback ID for the print file registered in the database 22D. As illustrated in FIG. 10, in the information related to the feedback ID for the print file, respective information, that is, the feedback ID, the file specifying key, and a valid flag indicating validity of the feedback ID are registered in association with each other. "YES" is stored in the valid flag when the feedback ID is valid, that is, when the feedback ID indicates that it is possible to make feedback on the print file; otherwise, "NO" is stored.

When the valid flag is set to "NO" according to the registering user, the feedback is prohibited (that is, the feedback ID is invalidated). On the other hand, when the valid flag is set to "YES", the feedback is permitted. As will be described in detail later, the valid flag set to "YES" is changed from "YES" to "NO" when feedback is made a predetermined number of times (for example, once).

As illustrated in FIG. 8, the image forming apparatus 60 receives the feedback ID transmitted from the file registration unit 22 and presents the feedback ID to a using user side (steps S223 and S224). A process of presenting the feedback ID to the using user side may present a material printed by the CPU 61 of the image forming apparatus 60 executing the unique program 60P, or may display information on the UI unit 67 (step S223). The CPU 61 of the image forming apparatus 60 may transmit and provide information indicating the feedback ID to the using-side terminal 50 using an email or the like (step S224).

By the information processing described above, the using user can acquire the material which has been based on the print file, and can also acquire the feedback ID to the feedback posting unit 24 that enables to make the feedback on the print file. When acquiring the feedback ID, the using user accesses the feedback posting unit 24 in order to enable to make feedback on the printed print file (step S226).

The feedback ID is provided after printing the print file, so that the printing of the print file and the giving of the feedback on the print file can be executed asynchronously with a time difference. In this way, for example, it is possible to prevent the using user from hogging the image forming apparatus 60, and it is possible to reduce a time taken to use the image forming apparatus 60.

The feedback posting unit 24 transmits information indicating a feedback posting request as a response to the access from the using-side terminal 50 (step S228). The information indicating the feedback posting request includes information that prompts inputting of the feedback information including impressions, opinions, or the like of the user in a format that allows to post the feedback information so as to correspond to the print file. For example, the CPU 241 of the feedback posting unit 24 returns, to the using-side terminal 50, post information in a format (input format) that allows to post the feedback information in which the feedback ID is associated with post contents including the feedback such as the impressions or the opinions of the user.

The using user inputs the feedback in accordance with the post information from the feedback posting unit 24, thereby responding to the feedback posting request (step S230). Specifically, the CPU 51 of the using-side terminal 50 performs a process of inputting the information including the feedback with respect to the post information received from the feedback posting unit 24 and transmits to the feedback posting unit 24, as a response, the post information to which the feedback by the using user is input.

When receiving the response to the post information from the using-side terminal 50, the feedback posting unit 24 posts the feedback information to the SNS 40 (step S232). Specifically, the CPU 241 of the feedback posting unit 24 posts the feedback information to the SNS 40 by transmitting, to the SNS 40, the feedback information in which the feedback ID is associated with the post content including the feedback such as the impressions or the opinions of the user.

The SNS 40 receives the post from the feedback posting unit 24 and performs control of allowing users to browse the post.

Therefore, the information processing apparatus 20 transmits, to the SNS 40, the feedback information including the feedback from the using-side terminal 50 based on the feedback ID indicating that it is possible to make feedback.

When receiving the feedback information from the using-side terminal 50, the feedback posting unit 24 executes a process of limiting the use of the feedback ID (step S234).

Specifically, when receiving the feedback information from the using-side terminal 50, the CPU 241 of the feedback posting unit 24 executes a predetermined process of invalidating the use of the feedback ID. The predetermined process of invalidating the use of the feedback ID includes a process of setting the number of available uses of the feedback ID. For example, when the number of available uses is set to "0", it is possible to prevent the same using user from making a post plural times. When the number of available uses is set to "1" or more, it is possible to allow the same using user to make a post plural times (that is, by the set number of available uses), and prevent the same using user from making a post more than the number of times represented by the set number of available uses.

Accordingly, the information processing apparatus 20 can limit the post of the feedback information including the feedback from the using-side terminal 50 based on the feedback ID indicating that it is possible to post, by the process of limiting the use of the feedback ID to the predetermined number of times of post.

By the information processing described above, the registering user enters a state in which he/she is permitted to browse the feedback on the print file. Specifically, the registering user uses the registering-side terminal 30 to request the SNS 40 to browse the feedback posted via the feedback posting unit 24 (step S236). The SNS 40 transmits, to the registering-side terminal 30, the feedback posted as the response to the request from the registering-side terminal 30 (step S238).

As described above, according to the present exemplary embodiment, the printing of the print file and the feedback on the print file can be performed using the file specifying key generated in registration and the feedback ID generated in printing which is different from the file specifying key. In this way, when the print file is printed, making feedback is enabled using the feedback ID generated in the printing, so that it is possible to prevent feedback when printing is not performed.

In the exemplary embodiment described above, the case where one registering-side terminal 30 and one using-side terminal 50 are provided has been described. The technique of the present disclosure is not limited to this case. The number of at least one of the registering-side terminal 30 or the using-side terminal 50 may be two or more. The information processing system including one image forming apparatus 60 has been described. The technique of the present disclosure is not limited thereto. Two or more image forming apparatuses 60 may be provided in the information processing system. The case where the information processing apparatus 20 includes the file registration unit 22 and the feedback posting unit 24 has been described. Alternatively, the information processing apparatus 20 may be implemented by a single apparatus.

In the exemplary embodiment described above, the case where the file is the print file has been described. The technique of the present disclosure is not limited to this case. The file may be a content file such as a sound file and a video file that can be listened or viewed by the using user.

In the exemplary embodiment described above, the case where the information related to the use of the print file is a post that records the feedback on the print file has been described. The technique of the present disclosure is not limited to this case. For example, the information related to the use of the print file may include information indicating a reaction of the using user. For example, information that can quantitatively represent the reaction of the user may be applied to the information in which the feedback such as the post described above is written with a sentence or the like. An example of the information that can quantitatively represent the reaction of the user is a rating which indicates the reaction of the using user and which is given to the print file by the using user.

Specifically, the rating indicating the reaction of the using user may be an evaluation physical quantity for quantitatively representing the reaction of the using user to the print file. As an example of the evaluation physical quantity, a value of an instruction index such as "like" indicating a favorable reaction of a user may be applied. By giving the value of the instruction index such as "like" to the print file, the registering user can quantitatively confirm the reaction of the user.

As another example of the evaluation physical quantity, a value of an action index such as "gift" or "donation" indicating that at least a part of possession information (for example, information corresponding to points or money that can be used on the network) possessed by the user is provided may be applied. By giving the value of the action index such as "gift" or "donation" to the print file, the registering user can also quantitatively confirm the reaction of the user. This action index may be designed such that a value of the action index increases as a magnitude of the reaction of the using user to the print file increases. In this way, the registering user can confirm the magnitude of the reaction of the using user to the print file as the feedback. The process of giving the instruction index, the action index, or the like may be performed in cooperation with an independent external system. When the process is performed in cooperation with the external system, the external system may execute a process of invalidating feedback on a print file which is not associated with a feedback ID.

First Modification

A first modification will be described, in the exemplary embodiment described above, the example of the file registration unit 22 that generates the key (specifically, the file specifying key) as the first identification information for uniquely identifying the print file has been described. The technique of the present disclosure does not intend to limit a form of the information indicating the file specifying key. For example, the file specifying key may be represented by a two-dimensional code.

FIG. 11 is a diagram illustrating a configuration example of a file registration unit 22A according to the first modification. The file registration unit 22A illustrated in FIG. 11 has the same configuration as the file registration unit 22 illustrated in FIG. 6. Thus, the same elements are designated by the same reference numerals, detailed description thereof will be omitted, and different elements will be described.

In the file registration unit 22A according to the first modification, a two-dimensional code generator 229 is connected to the I/O 225. The two-dimensional code generator 229 is a functional unit that generates the two-dimensional code based on plural pieces of information including other information in addition to the file specifying key described above.

In the first modification, the two-dimensional code generator 229 can replace the file specifying key with the two-dimensional code to embed the other information. Examples of the other information include print settings, a designation of an applied service of the SNS 40 on which a post is to be made, a designation of a feedback type, and a thumbnail URL. Embedding the other information removes a burden of inputting and searching in each process.

When the first modification enables to designate (embed) the information indicating the print settings as the other information, it is possible for the registering user to designate the print settings in advance, and it is possible to reduce a process load such as manual work when the using user is prompted to select the print settings in printing. It is also possible to designate print settings that the registering user wants to set.

When the first modification enables to designate an applied service of the SNS 40 as the other information, it is possible for the registering user to designate an application target SNS 40 on which a post is to be made in advance, and the feedback posting unit 24 can return the feedback to the designated SNS 40. An aspect of the post information (for example, the information indicating a feedback posting screen) in the format (input format) that enables to post the feedback information, which is the information indicating the feedback posting request described above can be provided using the information corresponding to the service of the designated SNS.

When the first modification enables the registering user to designate the feedback type as the other information, if the feedback type is designated in advance by the registering user, it is possible to designate a tendency of the feedback corresponding to a predetermined feedback that the registering user wants (for example, wants to get more "likes" on the SNS 40). Since the tendency of feedback that the registering user wants to get has been designated, the using user is also less likely to be confused about how to respond.

Second Modification

A second modification will be described. In the second modification, the feedback ID is replaced with a two-dimensional code.

Figure 12:
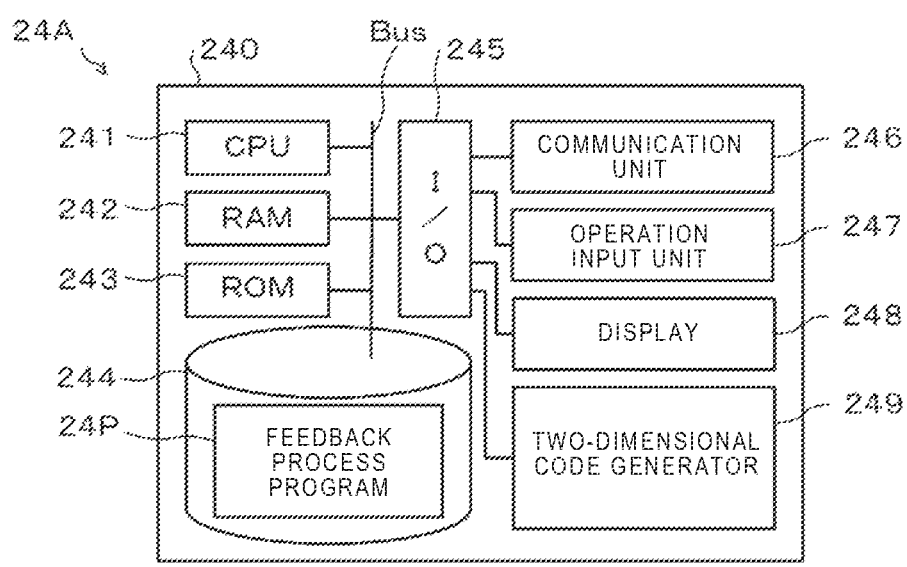
FIG. 12 is a diagram illustrating a configuration example of a feedback posting unit according to a second modification.

FIG. 12 is a diagram illustrating a configuration example of a feedback posting unit 24A according to the second modification. The feedback posting unit 24A illustrated in FIG. 12 has the same configuration as that of the feedback posting unit 24 illustrated in FIG. 7, the same elements are designated by the same reference numerals, the detailed description thereof will be omitted, and different elements will be described.

In the feedback posting unit 24A according to the second modification, a two-dimensional code generator 249 is connected to the I/O 245. The two-dimensional code generator 249 is a functional unit that generates a two-dimensional code based on plural pieces of information including other information in addition to the feedback ID described above.

As an example of the other information, location information such as a URL for accessing the feedback posting unit 24 is applied. By embedding the location information such as the URL, it is possible to prevent the using user from performing work such as taking notes during printing.

Other Exemplary Embodiments

The information processing apparatus according to the exemplary embodiment has been described above as the example. The exemplary embodiment may be embodied in the form of a program that causes a computer to execute the functions of the respective units provided in an information processing apparatus. The exemplary embodiment may be embodied in the form of a non-transitory computer readable storage medium that stores the program.

The configuration of the information processing apparatus described in the above exemplary embodiment is a mere example, and may be changed depending on a situation within the scope that does not depart from the gist of the present disclosure.

The flow of the processes of the program described in the above exemplary embodiment is also a mere example, and unnecessary steps may be deleted, a new step may be added, or an order of processes may be changed within the scope that does not deviate from the gist of the present disclosure.

In the above exemplary embodiment, the case where the processes according to the exemplary embodiment are implemented by a software configuration using the computer by executing the program has been described. It is noted that the present disclosure is not limited to this case. The exemplary embodiment may be implemented by, for example, a hardware configuration or a combination of a hardware configuration and a software configuration.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
when performing control of outputting a file from a storage unit in accordance with a request from a using user, issue second identification information to the using user, the file having been stored by a registering user in the storage unit, the file being associated with first identification information for identifying the file, the second identification information to be used for recording information related to use of the file and being provided after printing of the file;
upon receipt of the second identification information from the using user:
perform control of recording the information related to the use of the file; and
set a number of times the using user may post on the file and include the setting into the second identification information, and perform control of invalidating the information related to the use of the file when the information related to the use of the file is provided more than the set number of times.

2. The information processing apparatus according to claim 1, wherein
the processor is configured to:

after performing the control of outputting of the file, perform control of outputting the second identification information.

3. The information processing apparatus according to claim 2, wherein
the information related to the use of the file comprises evaluation information indicating an evaluation the using user who used the file.

4. The information processing apparatus according to claim 3, wherein
the processor is configured to perform control for a file for printing among a plurality of the files registered in the storage unit.

5. The information processing apparatus according to claim 4, wherein
the processor is configured to:
perform, as the control of outputting the file, control of forming an image of the file by an image forming apparatus.

6. The information processing apparatus according to claim 2, wherein
the processor is configured to perform control for a file for printing among a plurality of the files registered in the storage unit.

7. The information processing apparatus according to claim 6, wherein
the processor is configured to:
perform, as the control of outputting the file, control of forming an image of the file by an image forming apparatus.

8. The information processing apparatus according to claim 1, wherein
the processor is configured to perform control for a file for printing among a plurality of the files registered in the storage unit.

9. The information processing apparatus according to claim 8, wherein
the processor is configured to:
perform, as the control of outputting the file, control of forming an image of the file by an image forming apparatus.

10. A non-transitory computer readable medium storing a program that causes a processor to execute information processing, the information processing comprising:
when performing control of outputting a file from a storage unit in accordance with a request from a using user, issuing second identification information to the using user, the file having been stored by a registering user in the storage unit, the file being associated with first identification information for identifying the file, the second identification information to be used for recording information related to use of the file and being provided after printing of the file;
upon receipt of the second identification information from the using user:
performing control of recording the information related to the use of the file; and
setting a number of times the using user may post on the file and include the setting into the second identification information, and performing control of invalidating the information related to the use of the file when the information related to the use of the file is provided more than the set number of times.

11. An information processing method comprising:
when performing control of outputting a file from a storage unit in accordance with a request from a using user, issuing second identification information to the using user, the file having been stored by a registering user in the storage unit, the file being associated with first identification information for identifying the file, the second identification information to be used for recording information related to use of the file and being provided after printing of the file;
upon receipt of the second identification information from the using user:
performing control of recording the information related to the use of the file; and
setting a number of times the using user may post on the file and include the setting into the second identification information, and performing control of invalidating the information related to the use of the file when the information related to the use of the file is provided more than the set number of times.

* * * * *